United States Patent
Pintiysky et al.

(10) Patent No.: US 10,546,120 B2
(45) Date of Patent: Jan. 28, 2020

(54) SYSTEM AND METHOD OF FORMING A LOG IN A VIRTUAL MACHINE FOR CONDUCTING AN ANTIVIRUS SCAN OF A FILE

(71) Applicant: AO Kaspersky Lab, Moscow (RU)

(72) Inventors: Vladislav V. Pintiysky, Moscow (RU); Denis V. Anikin, Moscow (RU); Denis Y. Kobychev, Moscow (RU); Maxim Y. Golovkin, Moscow (RU); Vitaly V. Butuzov, Moscow (RU); Dmitry V. Karasovsky, Moscow (RU); Dmitry A. Kirsanov, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 156 days.

(21) Appl. No.: 15/714,284

(22) Filed: Sep. 25, 2017

(65) Prior Publication Data

US 2019/0095615 A1  Mar. 28, 2019

(51) Int. Cl.
*G06F 21/00* (2013.01)
*G06F 21/53* (2013.01)
*G06F 21/56* (2013.01)
*G06F 21/55* (2013.01)
*G06F 21/60* (2013.01)

(52) U.S. Cl.
CPC ............ *G06F 21/53* (2013.01); *G06F 21/552* (2013.01); *G06F 21/566* (2013.01); *G06F 21/568* (2013.01); *G06F 21/60* (2013.01)

(58) Field of Classification Search
CPC ...... G06F 21/552; G06F 21/566; G06F 21/53; G06F 21/568; G06F 21/60
See application file for complete search history.

(56) References Cited

U.S. PATENT DOCUMENTS

| | | | |
|---|---|---|---|
| 6,493,837 B1 * | 12/2002 | Pang | G06F 11/3466 707/999.202 |
| 7,779,472 B1 | 8/2010 | Lou | |
| 8,479,286 B2 | 7/2013 | Dalcher et al. | |
| 8,510,838 B1 * | 8/2013 | Sun | G06F 21/53 713/150 |
| 9,679,139 B1 * | 6/2017 | Monastyrsky | G06F 21/566 |
| 2004/0225877 A1 * | 11/2004 | Huang | G06F 21/552 713/100 |

(Continued)

*Primary Examiner* — Don G Zhao
(74) *Attorney, Agent, or Firm* — Arent Fox LLP; Michael Fainberg (57) ABSTRACT

Disclosed are systems and methods for generating a log for conducting an antivirus scan of a file. The described technique includes opening a file in a virtual machine, which causes execution of a guest process and a thread in a (virtual) processor of the virtual machine. The technique includes identifying, during execution of the first thread, events that involve alteration of guest physical memory pages of the virtual machine. The technique determines altered guest physical memory page based on analysis of the log and identifies when a transfer of control to altered guest physical memory pages has occurred. The resultant log for analysis by a security application includes information indicating the events occurring during execution of the thread in the altered guest physical memory page, and context data of the virtual processor on which the thread is being executed.

18 Claims, 5 Drawing Sheets

(56) References Cited

U.S. PATENT DOCUMENTS

| | | | |
|---|---|---|---|
| 2012/0066762 A1* | 3/2012 | Todorovic | G06F 21/53 726/22 |
| 2012/0317570 A1 | 12/2012 | Dalcher et al. | |
| 2015/0020071 A1* | 1/2015 | Phelan | G06F 9/5016 718/1 |
| 2015/0082430 A1* | 3/2015 | Sridhara | G06F 21/566 726/23 |
| 2015/0370724 A1 | 12/2015 | Lutas | |
| 2016/0048679 A1 | 2/2016 | Lutas | |
| 2016/0154663 A1* | 6/2016 | Guthrie | G06F 11/1451 718/1 |
| 2017/0039371 A1 | 2/2017 | Lukas et al. | |
| 2017/0147816 A1* | 5/2017 | Schilling | G06F 21/56 |
| 2017/0289191 A1* | 10/2017 | Thioux | H04L 63/1441 |

* cited by examiner

SYSTEM AND METHOD OF FORMING A LOG IN A VIRTUAL MACHINE FOR CONDUCTING AN ANTIVIRUS SCAN OF A FILE

FIELD OF TECHNOLOGY

The present disclosure relates generally to solutions for identifying malicious files and, more particularly, to systems and methods of forming a log for conducting an antivirus scan of a file.

BACKGROUND

At present, the amount of malicious software (such as computer viruses, Trojan horses, Internet worms) is on the rise, aimed at causing harm to both the data of the user and to the user of an electronic device infected with malicious software. The harm may be caused by damage to or removal of user files, the unauthorized use of the resources of the user's computing device for "mining" cryptocurrencies, theft of electronic and confidential data of the user (e.g., correspondence, images, logins, passwords, bank card information) and other actions. Moreover, malicious software is constantly changing, as its creators resort to ever newer mechanisms of attack and defence against security applications. Various mechanisms are used, such as obfuscation of malicious code (in other words, placing an original text or executable program code in a form which preserves its functionality, yet resists analysis, understanding of the working algorithms and modification during decompiling, for example) or the use of emulation counteracting mechanisms (for example, malicious software endowed with functions of recognizing when it is being executed in an emulator, and does not manifest its malicious activity).

Furthermore, malicious software often does not manifest its malicious activity at once, but instead performs a multitude of calls of API functions (in the order of millions of calls), a huge number of cycles (in the order of billions of iterations), and stops working for a certain amount of time immediately after being launched (for example, for 1 hour by the use of the "Sleep ( )" function). The computing devices of a user today have high performance and multicore processors (there are also multiprocessor systems), so that a user might not notice or attach importance to the load status of one of the cores. Moreover, a user ordinarily makes use of the device after it has been turned on for more than one hour. Hence, there is no need for a malicious software to manifest its activity at once, if it has been launched.

In order to deal with the above approaches, the makers of security applications (such as antivirus applications) employ techniques making use of virtual machines in the form of an isolated environment for the safe execution of files. Often such virtual machines are known as sandboxes. The hypervisors under whose control such virtual machines run contain mechanisms for intercepting functions being called up by the applications being executed therein.

It should be noted that security applications employ various methods for detecting malicious software, for example, technologies such as signature and/or heuristic analysis. If the harmfulness of a file has not been determined in the analysis process (for example, if it does not have the digital signature of a trusted software manufacturer), it may be handed over by the security application for analysis of its behavior in the aforementioned virtual machine. The transferred file is then executed in the virtual machine, its actions and events being executed by calls for various functions are intercepted during the course of its execution, and the intercepted events and actions are kept in a log and subsequently analyzed by the security application or by an expert in computer security.

Thus, the known systems for intercepting and aggregating of events and actions work in two steps. In the first step, information is gathered, and in the second step it is analyzed.

One deficiency of the known systems and methods is that they do not influence the execution process during the process of execution of a file. For example, a process launched from a file being analyzed (or from an application which has opened the file being analyzed) might have halted its execution for an hour or attacks some email client or messenger (a program for exchanging messages) by accessing a file with saved passwords. But with the attacked program being absent in the virtual machine, the harmful behavior of the file will not be identified. This is because, not having found the required file with passwords, the malicious file concludes its execution itself and will not display its malicious activity.

SUMMARY

Thus, a system and method is disclosed herein for identifying malicious files by forming a log for conducting an antivirus scan of a file. The described system and methods of the present disclosure make it possible to influence the process of execution of a file in a virtual machine during analysis of the file for harmfulness.

In one exemplary aspect, a method for generating a log for conducting an antivirus scan of a file comprises: opening a file in a virtual machine, wherein the opening of the file comprises execution of a guest process having a first thread in a virtual processor of the virtual machine; identifying, during execution of the first thread, a first event that involves alteration of at least one guest physical memory page; determining at least one altered guest physical memory page based on analysis of the log; identifying a transfer of control to the least one altered guest physical memory page; and generating the log associated with opening of the file, wherein the log includes information indicating the first event occurring during execution of the first thread in the altered guest physical memory page, and context data of the virtual processor on which the first thread is being executed.

In one exemplary aspect, the method further comprises: determining that the file opened in the virtual machine is harmful based on an analysis of the generated log.

In one exemplary aspect, identifying the transfer of control to the least one altered guest physical memory page further comprises: detecting that a second thread is executing code from a virtual address that is contained on the altered guest physical memory page, wherein the second thread was launched from the same process as a thread which altered the memory page.

In one exemplary aspect, identifying the transfer of control to the least one altered guest physical memory page further comprises: detecting that a second thread is executing code from the altered guest physical memory page, wherein the second thread was launched from a process different from the process that altered the memory page.

In one exemplary aspect, identifying, during execution of the first thread, the first event that involves alteration of the at least one guest physical memory page comprises: detecting a system call by the first thread of an application programming interface (API) function.

In one exemplary aspect, determining the at least one altered guest physical memory page based on analysis of the log further comprises: determining identifiers of the altered guest physical memory pages.

In one exemplary aspect, the method further comprises: responsive to detecting a second event which does not alter at least one guest physical memory page during execution of the first thread, refraining from recording the second event to the log.

In one exemplary aspect, a system for generating a log for conducting an antivirus scan of a file comprises: a memory device configured to store guest physical memory pages of a virtual machine; and a processor configured to: open a file in the virtual machine, wherein the opening of the file comprises execution of a guest process having a first thread in a virtual processor of the virtual machine; identify, during execution of the first thread, a first event that involves alteration of at least one guest physical memory page; determine at least one altered guest physical memory page based on analysis of the log; identify a transfer of control to the least one altered guest physical memory page; and generate the log associated with opening of the file, wherein the log includes information indicating the first event occurring during execution of the first thread in the altered guest physical memory page, and context data of the virtual processor on which the first thread is being executed.

In one exemplary aspect, a non-transitory computer readable medium comprising computer executable instructions for generating a log for conducting an antivirus scan of a file, including instructions for: opening a file in a virtual machine, wherein the opening of the file comprises execution of a guest process having a first thread in a virtual processor of the virtual machine; identifying, during execution of the first thread, a first event that involves alteration of at least one guest physical memory page; determining at least one altered guest physical memory page based on analysis of the log; identifying a transfer of control to the least one altered guest physical memory page; and generating the log associated with opening of the file, wherein the log includes information indicating the first event occurring during execution of the first thread in the altered guest physical memory page, and context data of the virtual processor on which the first thread is being executed.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

By system module for analyzing a file for harmfulness in a virtual machine is meant in the present disclosure real-world devices, systems, components, and groups of components realized with the use of hardware such as integrated microcircuits (application-specific integrated circuits, ASICs) or field-programmable gate arrays (FPGAs) or, for example, in the form of a combination of software and hardware such as a microprocessor system and set of program instructions, and also neurosynaptic chips. The functionality of such system module may be realized solely by hardware, and also in the form of a combination, where some of the functionality of the system modules is realized by software, and some by hardware. In certain aspects, some or all of the modules may be executed on the processor of a general-purpose computer (such as the one shown in FIG. 5). The system components (each of the modules) may be realized both within a single computing device and spread out among several interconnected computing devices.

Figure 1:
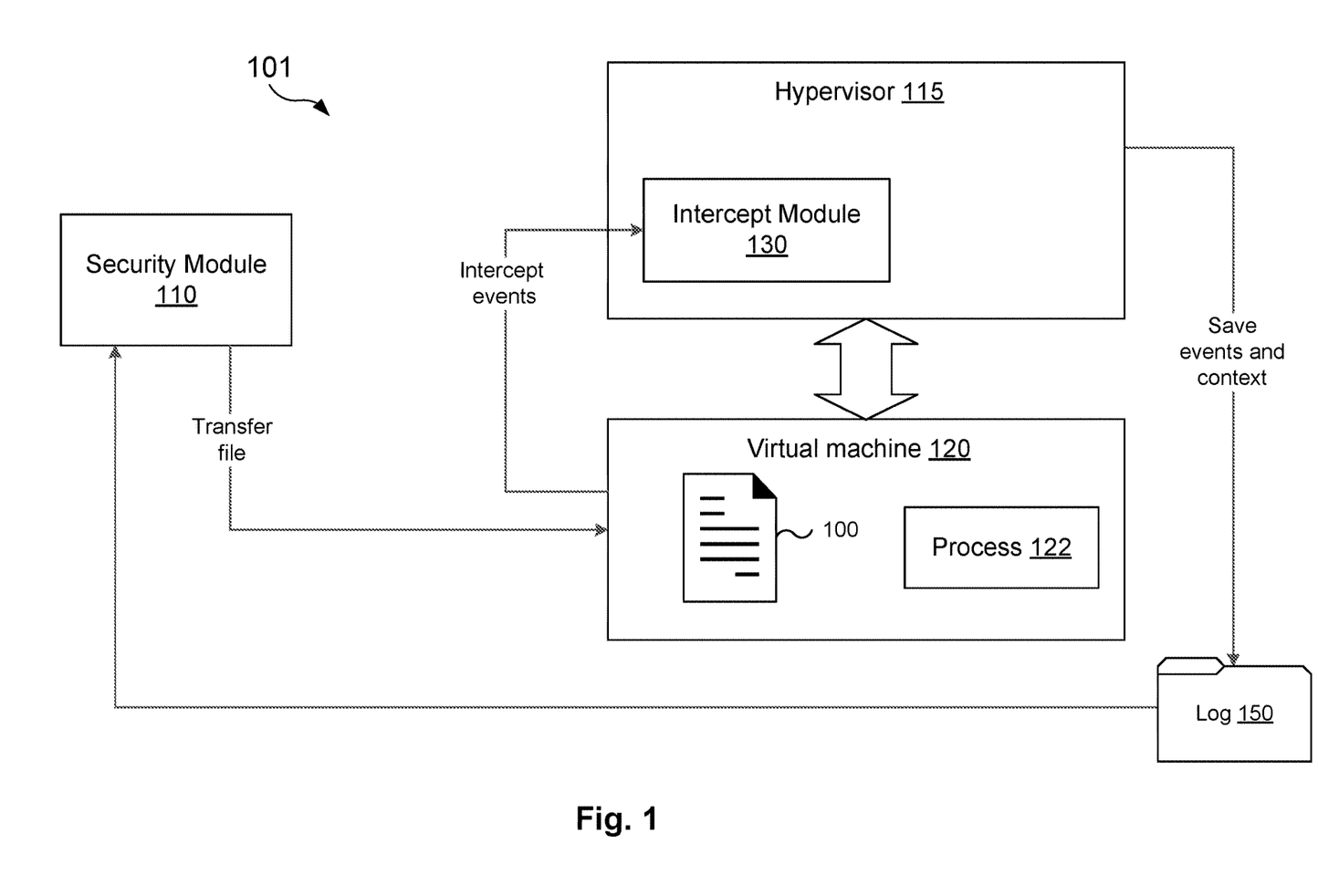
FIG. 1 is a block diagram illustrating example operations for analyzing a file for harmfulness in a virtual machine.

FIG. 1 is a block diagram illustrating example operations for analyzing a file for harmfulness in a virtual machine. A system 101 may include a security module 110 configured to perform analysis of the harmfulness of a file 100. The system 101 may include a hypervisor 115 configured to support execution of a virtual machine 120 on a computing device. A virtual machine 120 in the form of an environment for the safe execution of a file is a set (a complex) of hardware and software providing the resources of a host operating system to a guest operating system, while the guest operating system has no links to the host operating system.

In the general case, in order to be analyzed for harmfulness, a file 100 is opened in a virtual machine 120 in the form of an isolated environment for the execution of files. A security module 110 transfers the file 100 to the virtual machine 120. In one exemplary aspect, the virtual machine 120 is created by the security module 110. In another exemplary aspect, the virtual machine 120 is selected by the security module 110 from previously created virtual machines.

The file 100 may be any computer resource for recording data discretely on a storage device of the system 101. For example, the file 100 may be an
    a program, in the form of an executable file;
    data used by a program, e.g., a dynamic library
    a script executed by any given interpreter (such as Microsoft PowerShell® files);

files containing execution scripts (such as Microsoft Office® or Adobe Acrobat® file formats);

a web page, e.g., a document in markup language (HTML) which may contain executable code (such as JavaScript) embedded in the document or imported by a reference link (via the "src" attribute of a <script> element);

an image;

other types of files that are known to cause harm to the data of the user of the computing device when used (for example, when executed or opened by other applications).

In one exemplary aspect, the file 100 may be a link (such as a uniform resource locator (URL) or indicator (URI)).

In the general case, the analysis of the file 100 is done after its opening in the operating system of the virtual machine 120. By opening of a file 100 is meant one of:

the execution of the file 100, if the file 100 is executable;

the opening of the file 100 by an application, if the file 100 is not executable.

The result of the opening of the file 100 is the creation of a process 122 and the launching of its execution within the virtual machine 120. At least one thread is created for this process 122.

In one exemplary aspect, the security module 110 and the monitor of virtual machines (hereinafter, the hypervisor 115) under whose control the virtual machine 120 runs are executed on the computing device of a user. In one exemplary aspect, the security module 110 may be a security application or other software component (e.g., plug-in, extension) executing on a computing device (such as an antivirus application, anti-malware applications, Trojan virus mail filters, etc.) In another aspect, the security module 110 and the hypervisor 115 are executed on a remote server (or on different servers) or as a cloud service. The security module 110 in this case obtains the file 100 from outside sources (for example, from security module 110 running on the computing devices of a user), and transfers it to the virtual machine 120, where the opening of the file 100 occurs.

In one exemplary aspect, the hypervisor 115 includes an intercept module 130. The intercept module 130 may be a module, component or functional part of the hypervisor 115. The intercept module 130 is configured to intercept the calls of Application Programming Interface (API) functions by the threads of the process 122 created upon opening of the file 100 in the virtual machine 120 and reads the context of the processor on which the thread calling the API function is being executed. It should be noted that the context of the processor contains at least the values of the registers of the processor. In one aspect, the intercept module 130 also reads the call stack, using the previously read data contained in the registers of the processor corresponding to the call stack (for example, memory at the address from the stack pointer (% ESP) and base pointer (% EBP) registers). Moreover, the intercept module 130 is configured to aggregate the aforementioned data, saves it (for example, in a database or in a log 150, described later) and sends it to the security module 110 after execution of the process created upon opening of the file 100. The security module 110 in turn pronounces a verdict on the basis of the data from the intercept module 130 as to the harmfulness of the file 100. In the general case, the verdict is pronounced after analysis of the saved data, for example, depending on the sequence and the parameters used for the calling of API functions by the threads of the process 122 created upon opening the file 100. In one exemplary aspect, if no verdict is pronounced, the data saved by the intercept module 130 is sent by the security module 110 to an outside resource or service, including third-parties, such as a specialist in computer security (not shown in FIG. 1), for analysis.

Figure 2:
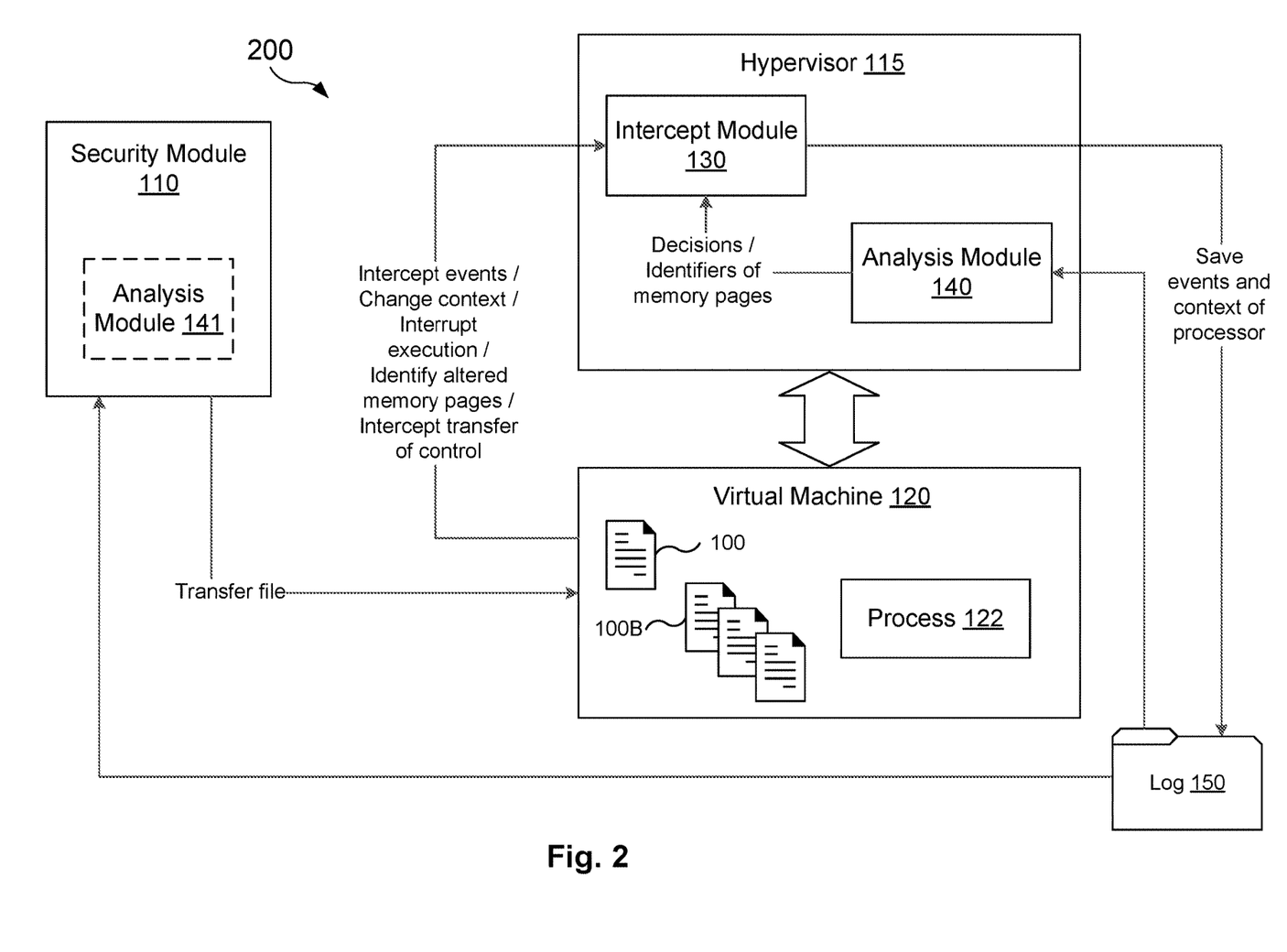
FIG. 2 is a block diagram illustrating a system of forming a log to conduct an antivirus scan of a file according to an exemplary aspect.

FIG. 2 is a block diagram illustrating a system 200 for forming a log 150 to conduct an antivirus scan of a file according to an exemplary aspect of the present disclosure.

The present disclosure is characterized in that the proposed system 200, along with an intercept module 130, also contains an analysis module 140. In one exemplary aspect, the hypervisor 115 contains the analysis module 140. In another exemplary aspect, the analysis module may be a component (module, functional part) of the security module 110 (as represented by module 141).

In the general case, the intercept module 130 is configured to intercept the events in the threads of the process 122 created upon opening of the file 100.

Examples of events that can be intercepted include:

the calling of an API function by a thread;

the return from the API function;

a system call or, in other words, an accessing by the thread to the kernel of the (guest) operating system to execute a particular operation;

the return from a system call;

an alert (message, notification) from the guest operating system (for example, the creation of a thread, the creation of a process, the loading of a module).

In the case of interception of an event, the execution of the thread is halted by the intercept module 130. It should be noted that the interception is possible at various rings of defense of the guest operating system of the virtual machine 120 realizing the hardware separation of the system and user level of privileges. This means interception of events can occur at the kernel level (kernel mode) or at the applications level (user mode). The execution of the thread may be halted by halting the execution of the instructions of the thread.

It should be noted that in the general case, during the execution of the threads of a process 122 created upon opening a file 100, the intercept module 130 is configured to determine the coding convention of the API functions being called by the threads. This allows a clear determination of the use of the registers of the processor for the sending of parameters to the API functions called. Thus, for example, the parameters of the calls can be found in the general-purpose registers ECX (first parameter), EDX (second parameter), and the other parameters can be in the stack (register ESP). Furthermore, the coding convention allows a clear determination of the values being returned. For example, if an API function returns a value of "0", this will be done in the general-purpose register EAX. For purpose of explanation, the present disclosure refer to specific registers (EAX, ESP, etc.) and nomenclature of the Intel® x86 architecture, but it is understood that aspects of the present disclosure may be used with analogous data structures in other platforms.

The intercepted event and the context of the processor are saved by the intercept module in the log 150. After saving, the log 150 is sent by the intercept module 130 to the analysis module 140.

The analysis module 140 may be configured to use a set of templates. In one exemplary aspect, the templates are saved in a data structure (such as a tree). Templates may be added to the data structure by the analysis module 140 during the launching of the virtual machine 120. In another exemplary aspect, the templates are selected by the analysis module 140 from a database.

In the general case, a template contains one or more rules. In one aspect, each rule is assigned a priority. In other aspects, rules are added to a template systematically.

A rule represents a logical condition based on the use of logic operands (for example, IF or logical OR). Moreover, rules may be related to each other. In one exemplary aspect, a rule uses the saved context of the processor. In another exemplary aspect, a rule contains the logic of change of the context of the processor and the data for changing the context of the processor. In yet another aspect, a rule contains the logic by which the analysis module 140 recognizes the file opened 100 as being harmful.

Examples of the aforementioned rules are:

Rule 1: IF FileOpen("$SystemDrive:\<random name>") is called, THEN continue execution.

Rule 2: IF Rule 1 and FileWrite("$SystemDrive:\<random name>", text string), THEN continue execution.

In an example that matches the above example rule set, the thread of the process 122 created upon opening the file 100 accesses a random (requested) second file 100B in the root of the system disk. This second file 100B may have a programmatically generated name comprised of randomly generated characters and letters (e.g., "<random name>"). In itself, the event of creating (or reading) a requested file 100B is not harmful, but it has been determined that it is often the start of a malicious functionality. Therefore, the analysis module 140 on the basis of the above rules 1 and 2 makes a decision to continue the execution of that thread. Later on, the requested file 100B is written into via the FileWrite( ) API function call. Depending on the type of requested file 100B and the information written into it, the requested file 100B may have a malicious functionality.

A more detailed example of the working of the system and the rules is the following set:

Rule 10: IF the file 100 is not signed, then continue the execution.

Rule 11: IF Rule 10, AND the file 100 has called FileOpen ("$SystemDrive:\<random name>"), THEN replace returned value with "Success" AND continue the execution.

Rule 12: IF rule 11, AND the file 100 has called FileWrite ("$SystemDrive:\<random name>"), the memory buffer being used by the process created upon opening the file 100), THEN recognize the file 100 as harmful AND terminate the execution.

It should be noted that, in the given example of the rules, "file 100" is used for a more cogent and clear representation of the rules. In the general case, the rule uses threads of the process created upon opening of the file 100.

In an example scenario that satisfies the above-described example rules 10-12, the file 100 is not digitally signed (using known techniques for cryptographically validating the authenticity and integrity of files). That is, the provider (creator) of the file 100 is unknown. Later on, the thread of the process 122 created upon opening of the file 100 in the execution process also accesses a random (second) file 100B in the root of the system disk. However, it has been determined that the (guest) operating system usually forbids the creating of a file in the root of the system disk (malicious files can try out other routes until the file is created). Therefore, the analysis module 140 on the basis of the rules makes a decision to replace the returned result with "success", the result is replaced with the aid of the intercept module 130, and then the execution of the thread of the process created upon opening the file 100 is continued. Afterwards, writing is done to the created file 100B. If a memory buffer is written to the file created, the file may be harmful i.e., (have a malicious functionality). The analysis module 140 may determine it desirable to halt the analysis of the (first) file 100 and then perform an analysis on the created (second) file, and based on the results of the analysis of the created file pronounce a verdict on the harmfulness of the file 100.

It should be noted that the above described are only examples of rules. In the general case, rules may be more voluminous, for example, tracking the creation of a file by different paths, tracking the extension of the created file, analyzing the type of created file, allowing the creation of a file and tracking the further behavior of the threads of the process created upon opening the file 100 (for example, will there be an attempt to add the created file to the autostart list of the operating system in some known way), tracking the changing of attributes by the threads of both the file 100 and other files, and tracking access of the threads to the Internet.

In one exemplary aspect, the analysis module 140 also operates with expert data which is kept in a separate database. This data may also be used in the rules of the templates.

An example of such a rule might be:

Rule 21: IF the file 100 accesses a web resource, AND the web resource has been assigned a malicious category, THEN recognize the file 100 as being malicious.

It should be noted that, in the above example, the category of a web resource being accessed by the thread of a process created upon opening of the file 100 in the virtual machine has been previously determined (assigned) by a known method of classification and is saved in a separate database.

In one exemplary aspect, the rule contains a condition for the depth of analysis or depth of aggregation of the event. For example:

Rule 31: IF the file 100 executes a cycle, AND the context of the events of the calling of API functions does not change, THEN do not intercept the event of the return from the API functions.

This example of a rule (Rule 31) makes it possible to speed up the execution of the file 100 by reducing the number of intercepts of events and reading of context. If a thread of the process 122 created upon opening of a file 100 has called for a cycle with a duration in the order of one billion iterations, consisting of "CreateWindow( )", "CloseWindow( )" calls, the system can use the Rule 31 to refrain from intercepting and saving the context of each event. That said, the intercept module 130 in keeping with the above will work off at least four billion times (the cycle calls up two API functions, the event is the call and the return from the API function), and read the context of the processor just as many times.

In one exemplary aspect, the rule contains a condition for increasing the cycle variable. For example:

Rule 41: IF the file 100 executes a cycle, AND the context of the events of the call of the API functions does not change, THEN increase the value of the cycle variable by 5 times after every 10 iterations.

The above example Rule 41 can be used to speed up the execution of cycles by the thread of the process created upon opening the file 100 in the virtual machine 120. The analysis module 140 determines that the thread being executed is cyclically calling for certain events. Nothing occurs in this case, which is one of the known scenarios for anti-emulation. In order for the thread of the process created upon opening of the file 100 to manifest its functionality as fully as possible, it is necessary to finish the cycle as fast as possible and continue the execution. Thanks to the above described rule, the cycle will be finished several times faster.

In one exemplary aspect, the intercept module 130 discovers during the execution of the thread of the process created upon opening of the file 100 the occurrence of an event involving a changing of a page in the virtual memory (hereafter in the text, memory). In the general case, an event involving the changing of a page in the memory constitutes a calling of an API function by the thread. The changing of data in a memory page may occur both directly, for example by the calling of WriteProcessMemory( ), and covertly, for example by writing data with the use of SetWindowLong( ). In this case it is possible to discover, for example, the descriptor (handle) of the window. It should be noted that the writing into the memory of another process can be a perfectly legitimate operation from the standpoint of the operating system. But it has been determined that malicious programs also very often employ such mechanisms to insert malicious code. The events involving a changing of memory pages and the context of the processor are saved by the intercept module 130 in the log 150.

The analysis module 140 may be configured to determine which (guest physical) memory pages have been changed. By analysis of the log 150 in which the events involved in the changing of the memory pages have been saved, and the context of the processor, the analysis module 140 can discover identifiers (such as addresses or numbers) of the altered memory pages.

In one exemplary aspect, the analysis module 140 is configured to send the identifiers of the altered memory pages to the intercept module 130. The intercept module 130 likewise identifies a transfer of control to any one of the altered pages whose identifiers have been received from the analysis module 140. The transfer of control to a memory page generally means that a thread is executing code by a virtual address which is contained on that memory page. In one exemplary aspect, the identifying of a transfer of control is done in the case when the thread which is executing code from the altered page has been launched from the same process as the thread which altered the memory page. In another exemplary aspect, the identification of a transfer of control is done in the event that the thread which is executing code from the altered page has been launched from a process different from the process whose thread has altered the memory page. Thus, if the thread of the process 122 created upon opening of the file 100 has altered a memory page, and this page belongs to the same process (the changing of their own memory pages is used by malicious applications as a defense against signature analysis or a countermeasure to static analysis of executable code) or to a different process (for example, explorer.exe), it is necessary to intercept the events of the process when control is transferred to the altered memory page.

In the general case, after the transfer of control to an altered memory page has occurred, the intercept module 130 and the analysis module 140 may perform the above described actions.

An example of the above described is

Rule 51: IF the process created upon opening of a file 100 alters data in at least one memory page, THEN intercept the events upon transfer of control to at least one of the pages on which data has been altered.

Such a method that invokes the Rule 51 makes it possible to save on system resources during the analysis of applications which alter the memory pages of other applications. For example, the aforementioned anti-emulation scenarios (a multitude of API function calls not causing harm to the user's data) are not analyzed, and the analysis module 140 does not save (i.e., refrains from saving) every call in the log 150. In the given case, the only analysis is whether control will be transferred to the altered memory pages and whether the code in those altered pages of the virtual memory is malicious. The log 150 so formulated by the intercept module 130 only ends up getting the events which alter the memory pages and the events which occur upon executing the code from the altered memory pages. The technical results of this approach to generating the log 150 is to record behavior of a potentially malicious file in a log file for analysis more efficiently and in a manner that defeats current countermeasures and anti-emulation techniques.

Thus, the analysis module 140 after obtaining the log 150 from the intercept module 130 is configured to analyze the events which have occurred, that is, the events (current and prior) saved in the log 150, and the data of the events occurring (for example, the context of the processor corresponding to a particular event). The analysis may include a comparison the occurring events with a template. The event is compared sequentially with each rule saved in the template (depending on the order of the rules in the template or their priority). On the basis of the comparison, the analysis module 140 can make at least one of the decisions:

the decision to recognize the file 100 as being malicious;
the decision to halt the execution of the process created upon opening of the file 100;
the decision to change the context of the processor;
the decision to wait for the next event.

It should be noted that the analysis module 140 can combine the aforementioned decisions. For example, if a file 100 has been recognized as malicious, in one aspect, the execution of the process created upon opening of the file 100 can be halted. In another aspect, the execution of the process created upon opening of the file 100 can be continued, that is, waiting for the next event for further analysis of the behavior of the threads of the process and the creating of the log 150. In one aspect, the file 100 is recognized as malicious, but the context of the processor is changed and the next event is awaited. Such a sequence of actions is needed for a more full disclosure of the functionality of the file 100. For example, the file 100 has been recognized as malicious after yet another file containing malicious code was created in the analysis process. However, in certain cases (for example, a thread tries to download something from a malicious web resource) it makes sense to continue intercepting events and filling up the log 150 for analysis of the subsequent behavior of the threads of the process created upon opening of the file 100. In yet another aspect, even if the file 100 has not been recognized as malicious (for example, in the course of the execution a window opened up, awaiting input from the user), a decision is made to halt the execution of the process created upon opening of the file 100.

The decisions made are sent by the analysis module 140 to the intercept module 130. The intercept module 130 may be configured to execute the actions corresponding to the decisions made. In the event of a decision by the analysis module 140 to await the next event, the execution of the thread which was halted by the intercept module 130 is resumed.

In one aspect, the analysis module 140 initiates a rebooting of the virtual machine 120. For example, if in the process of analysis of the file 100 a new file was created, the path to which has been added to the autostart of the guest operating system of the virtual machine 120, the analysis module 140 initiates a rebooting in order to scan the functionality of the created file for harmfulness.

In the general case, after completing the analysis of the file 100 in the virtual machine 120, the intercept module 130 may send the log 150 to the security module 110. The analysis of the file 100 may be finished either in a natural way (the threads of the process created upon opening of the file 100 themselves finished their execution) or by decision of the analysis module 140 (the analysis module 140 has made a decision to halt the process created upon opening of the file 100).

Thus, the above system makes it possible to reveal the harmfulness of a file 100 on the basis of decisions from the analysis module 140, specifically on the basis of whether a decision has been made to recognize the file 100 as malicious.

Figure 3:
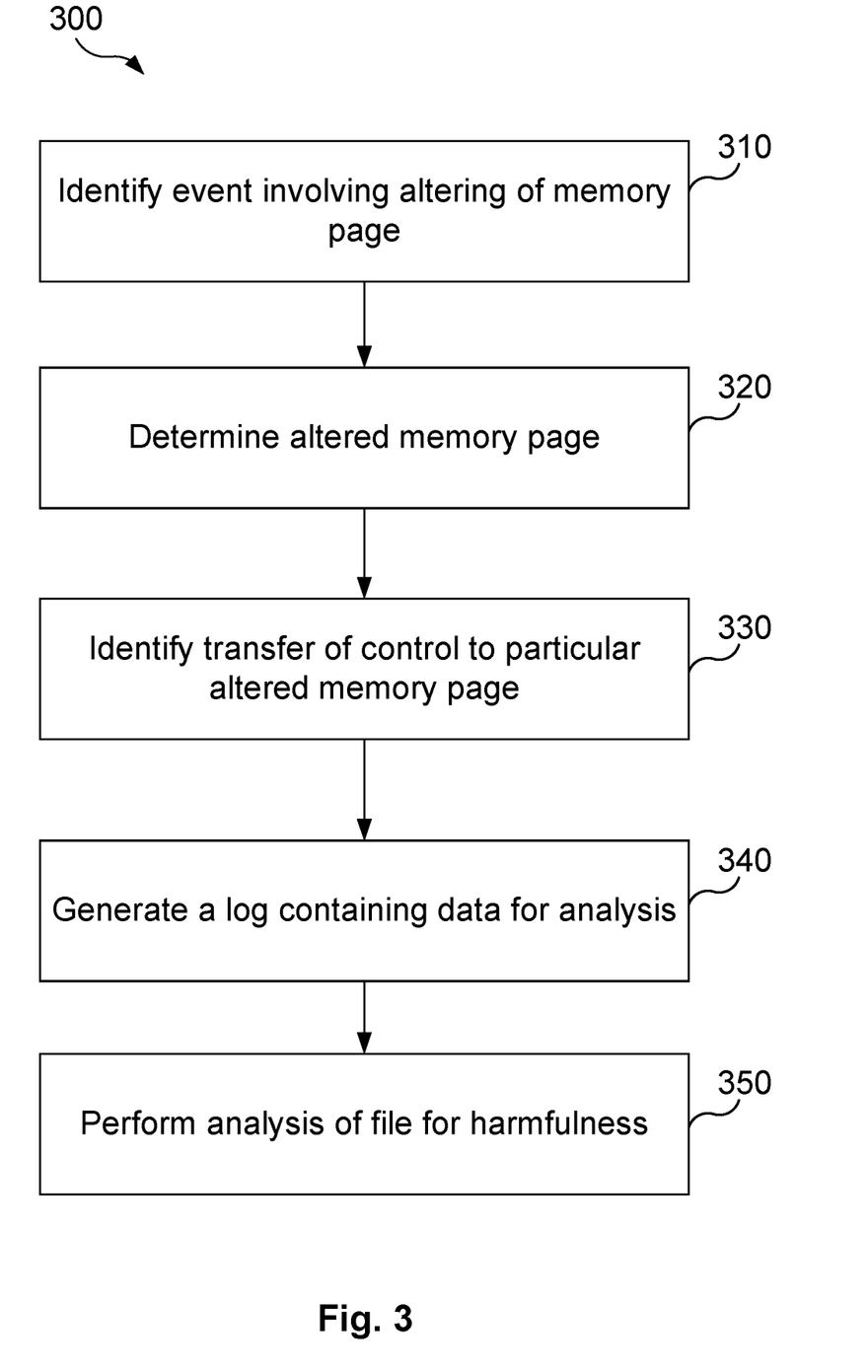
FIG. 3 is a flowchart illustrating a method of generating a log to conduct an antivirus scan of a file according to an exemplary aspect.

FIG. 3 is a flowchart illustrating a method of generating a log for conducting an antivirus scan of a file according to an exemplary aspect. It is noted that the following description of the exemplary method makes reference to the system and components described above. In the general case of generating a log for conducting an antivirus scan of a file, the security module 110 sends the file 100 to the virtual machine 120. The analysis of the file 100 is done after its opening in the operating system of the virtual machine 120. In some exemplary aspects, opening of the file 100 may include the execution of the file by, if the file is executable. In other aspects, the opening of the file may include the opening by a guest application executing in the virtual machine 120, if the file is not executable.

In the initial step 310, the intercept module 130 may identify, during the execution of the thread of the process created upon opening of the mentioned file, the occurrence of an event involving the alteration of at least one memory page. In the general case, the event involving the changing of a memory page may be a calling of an API function by the thread. That event and the context of the processor are saved by the intercept module 130 in the log 150.

In step 320, the analysis module 140 may determine at least one altered memory page by analysis of the data saved in the log 150. In one exemplary aspect, the identifiers of altered pages are used to determine the altered memory pages. The identifiers of the altered pages are sent by the analysis module 140 to the intercept module 130.

In step 330, the intercept module 130 may identify, during the execution of the thread of the process created upon opening of the file, a transfer of control to at least one altered memory page. The transfer of control to a memory page generally means that the thread is executing code from a virtual address which is contained on that memory page. In one exemplary aspect, the identifying of the transfer of control is done in the event that the thread which is executing the code from the altered page has been launched by the same process as the thread which altered the memory page. In another exemplary aspect, the identification of the transfer of control is done in the event that the thread which is executing the code from the altered page has been launched by a process different from the process whose thread altered the memory page.

In step 340, the analysis module 140 may generate the log 150, in which are saved:
  the events occurring during the execution of the thread of the process created upon opening of the mentioned file in the altered memory page;
  the context of the processor on which the thread of the process created upon opening of the mentioned file is being executed, as read during the occurrence of the event being saved in the log.

In one exemplary aspect, in step 350 after the forming of the log 150 in step 340, it is analyzed by the analysis module 140 to determine the harmfulness of the file being opened in the virtual machine.

Figure 4:
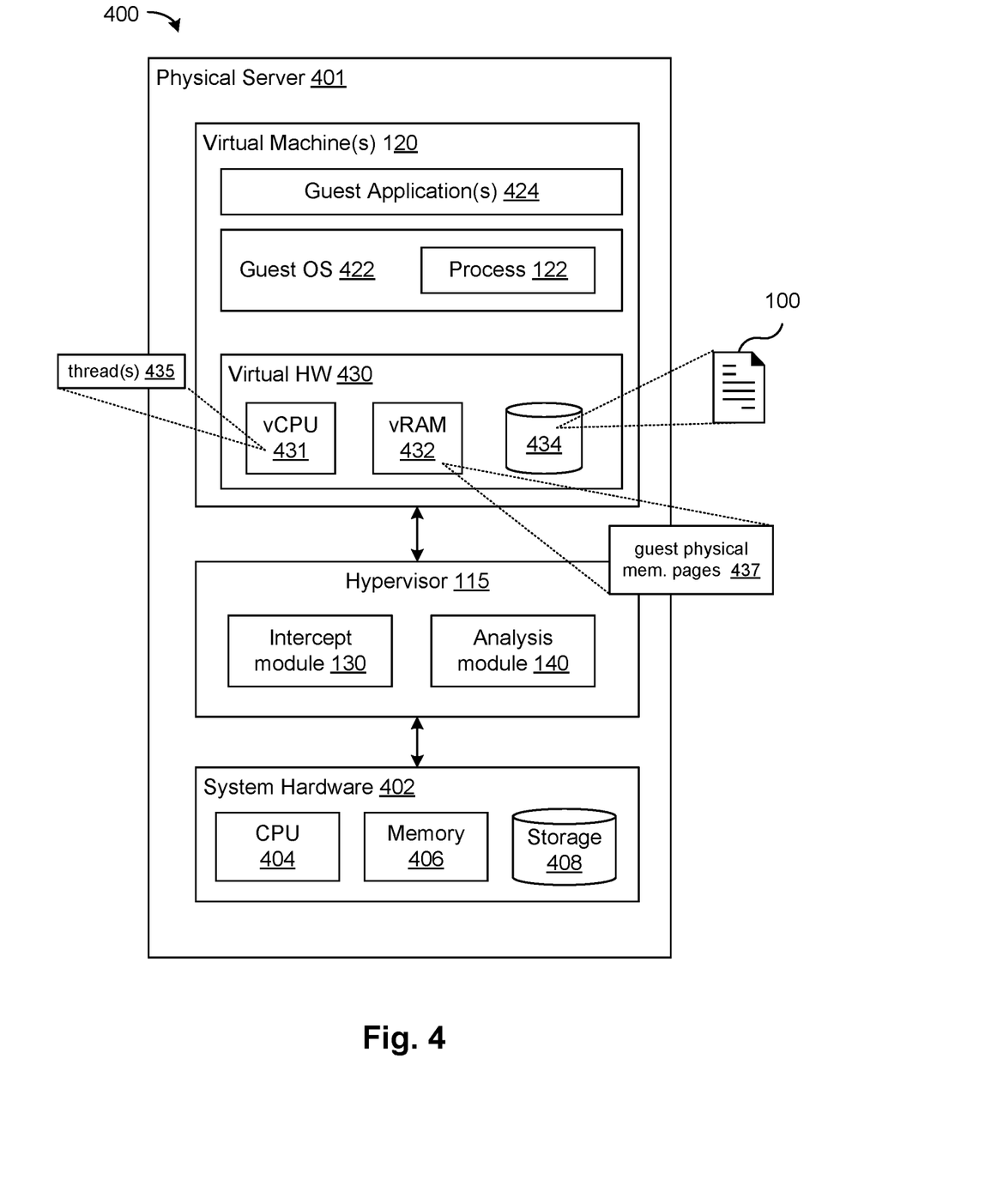
FIG. 4 is a block diagram illustrating a computer system configured to support execution of one or more virtual machines in an isolated environment for analysis.

FIG. 4 is a block diagram illustrating an exemplary system 400 configured to support execution of one or more virtual machines in an isolated environment for analysis. As shown, the system 400 generally includes one or more physical computers 401. Virtual machines 120 can be created on a host platform of the physical computers that includes system hardware 402 and a hypervisor 115 (also referred to as virtual machine monitor or a virtualizer). The hypervisor 115 provides a guest operating system 422 of the virtual machine 120 with a virtual operating platform (depicted as virtual hardware 430) and manages execution of the guest OS 422. The hypervisor 115 may run directly on the underlying system hardware 402 or as an application or component running within a host operating system (not shown) installed on the system hardware 402.

The physical computers 401 may be a physical server, host, computer server, desktop, laptop, handheld device, or any other electronic device sufficient for implementing virtualization as described herein. As shown, the system hardware 402 of a physical computer 401 can include a computer processing unit (CPU) 404, memory 406 (e.g., random access memory), and storage devices 408 (e.g., hard disk drives). The system 400 may include additional devices, software modules, and the like, as would be appreciated to one skilled in the art, but are not shown herein so as to not unnecessarily obscure the aspects of the disclosure.

In the exemplary aspect, the virtual machine 120 includes virtual system hardware 430 and guest system software, including the guest OS 422. The hypervisor 115 acts as the interface between guest software executing within the VM 120, including one or more guest applications 424 and guest OS 422, and the hardware components and devices in the underlying system hardware platform 402 of the host machine. The virtual system hardware 430 includes a virtual CPU 431, virtual memory 432, a virtual disk 434, as well as other virtual hardware components, such as a virtual network interface (not shown), and the like. It is noted that all of the virtual hardware components of the virtual machine 120 can be implemented in software to emulate corresponding physical components, as would be appreciated to on skilled in the art.

As shown in FIG. 4, the file 100 may be stored in the virtual disk 434. The opening of the file 100 within the virtual machine 120 results in in the creation of a process 122 by the guest operating system 422. At least one thread 435 (executing on the virtual CPU 431) is created for this process 122. If the file 100 is executable, the opening of the file 100 includes execution of the file 100 by the guest operating system 422, in which case the process 122 includes the program code of the file 100. If the file 100 is not executable, the opening of the file 100 includes the opening of the file 100 by a guest application 424, in which case the process 122 is an instance of the guest application 424.

In operation, the intercept module 130 may identify, during the execution of the thread 435, the occurrence of an event involving the changing of at least one guest physical memory page 437 of vRAM 432. That event may be related to the thread 435 making a system call (API function). That event and the context of the processor (vCPU 431) are saved by the intercept module 130 in the log 150. The analysis module 140 may determine at least one altered (guest physical) memory page 437 and their respective identifier(s)

based on analysis of the log 150. The intercept module 130 may identify, during the execution of the thread 435, a transfer of control to at least one altered memory page. The transfer of control to a memory page generally means that the thread is executing code from a (guest) virtual memory address which is contained on that (guest physical) memory page. The analysis module 140 may generate the log 150, which includes saving the following information: the events occurring during the execution of the thread 435 of the process 122 created upon opening of the mentioned file 100 in the altered memory page 437, and the context of the virtual processor 431 on which the thread 435 of the process 122, as read during the occurrence of the event being saved in the log. The analysis module 140 determine the harmfulness of the file being opened in the virtual machine 120 based on the log 150.

Figure 5:
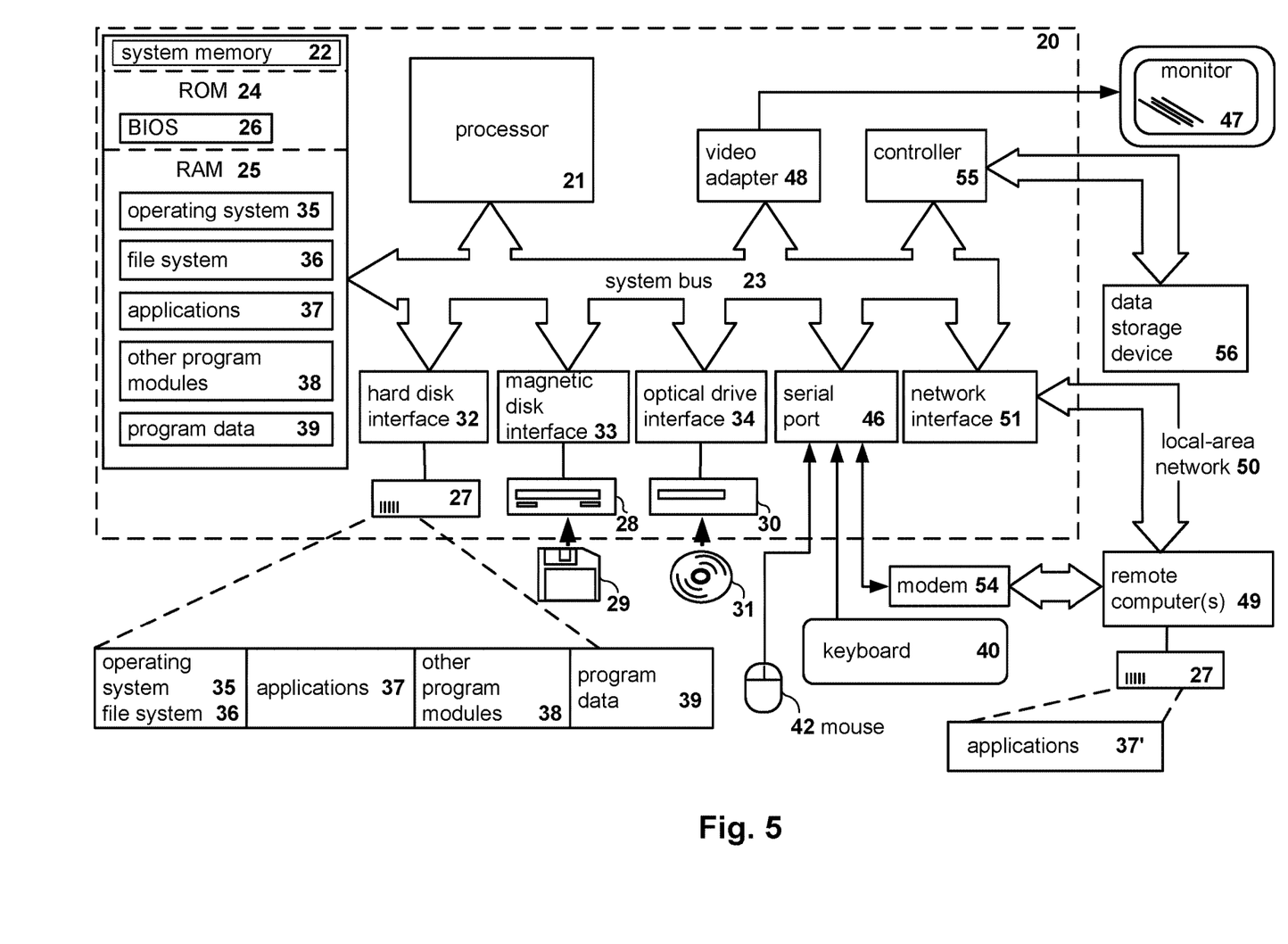
FIG. 5 is a block diagram of a general-purpose computer system on which the disclosed system and method can be implemented according to an exemplary aspect.

FIG. 5 is a block diagram illustrating a general-purpose computer system 20 on which aspects of systems and methods for forming a log for conducting an antivirus scan of a file may be implemented in accordance with an exemplary aspect. It should be noted that the computer system 20 can correspond to the systems 101, 200, and physical servers 401 described above, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for generating a log for conducting an antivirus scan of a file, wherein the method comprising:
   opening a file in a virtual machine, wherein the opening of the file comprises execution of a guest process having a first thread in a virtual processor of the virtual machine;
   identifying, during execution of the first thread, a first event that involves alteration of at least one guest physical memory page;
   determining at least one altered guest physical memory page based on analysis of the log;
   identifying a transfer of control to the least one altered guest physical memory page;
   generating the log associated with opening of the file, wherein the log includes information indicating the first event occurring during execution of the first thread in the altered guest physical memory page, and context data of the virtual processor on which the first thread is being executed; and
   responsive to detecting a second event which does not alter at least one guest physical memory page during execution of the first thread, refraining from recording the second event to the log.

2. The method of claim 1, further comprising:
   determining that the file opened in the virtual machine is harmful based on an analysis of the generated log.

3. The method of claim 1, wherein identifying the transfer of control to the least one altered guest physical memory page further comprises:
   detecting that a second thread is executing code from a virtual address that is contained on the altered guest physical memory page, wherein the second thread was launched from the same process as a thread which altered the memory page.

4. The method of claim 1, wherein identifying the transfer of control to the least one altered guest physical memory page further comprises:
   detecting that a second thread is executing code from the altered guest physical memory page, wherein the second thread was launched from a process different from the process that altered the memory page.

5. The method of claim 1, wherein identifying, during execution of the first thread, the first event that involves alteration of the at least one guest physical memory page comprises:
   detecting a system call by the first thread of an application programming interface (API) function.

6. The method of claim 1, wherein determining the at least one altered guest physical memory page based on analysis of the log further comprises:
   determining identifiers of the altered guest physical memory pages.

7. A system for generating a log for conducting an antivirus scan of a file, wherein the system comprises:
   a memory device configured to store guest physical memory pages of a virtual machine; and
   a processor configured to:
      open a file in the virtual machine, wherein the opening of the file comprises execution of a guest process having a first thread in a virtual processor of the virtual machine;
      identify, during execution of the first thread, a first event that involves alteration of at least one guest physical memory page;
      determine at least one altered guest physical memory page based on analysis of the log;
      identify a transfer of control to the least one altered guest physical memory page;
      generate the log associated with opening of the file, wherein the log includes information indicating the first event occurring during execution of the first thread in the altered guest physical memory page, and context data of the virtual processor on which the first thread is being executed; and
      responsive to detecting a second event which does not alter at least one guest physical memory page during execution of the first thread, refrain from recording the second event to the log.

8. The system of claim 7, wherein the processor is further configured to:
   determine that the file opened in the virtual machine is harmful based on an analysis of the generated log.

9. The system of claim 7, wherein the processor is configured to identify the transfer of control to the least one altered guest physical memory page is further configured to:
   detecting that a second thread is executing code from a virtual address that is contained on the altered guest physical memory page, wherein the second thread was launched from the same process as a thread which altered the memory page.

10. The system of claim 7, wherein the processor is configured to identify the transfer of control to the least one altered guest physical memory page is further configured to:
    detect that a second thread is executing code from the altered guest physical memory page, wherein the second thread was launched from a process different from the process that altered the memory page.

11. The system of claim 7, wherein the processor is configured to identify, during execution of the first thread, the first event that involves alteration of the at least one guest physical memory page is further configured to:

detect a system call by the first thread of an application programming interface (API) function.

12. The system of claim 7, wherein the processor is configured to determine the at least one altered guest physical memory page based on analysis of the log is further configured to:
determine identifiers of the altered guest physical memory pages.

13. A non-transitory computer readable medium comprising computer executable instructions for generating a log for conducting an antivirus scan of a file, including instructions for:
opening a file in a virtual machine, wherein the opening of the file comprises execution of a guest process having a first thread in a virtual processor of the virtual machine;
identifying, during execution of the first thread, a first event that involves alteration of at least one guest physical memory page;
determining at least one altered guest physical memory page based on analysis of the log;
identifying a transfer of control to the least one altered guest physical memory page;
generating the log associated with opening of the file, wherein the log includes information indicating the first event occurring during execution of the first thread in the altered guest physical memory page, and context data of the virtual processor on which the first thread is being executed; and
responsive to detecting a second event which does not alter at least one guest physical memory page during execution of the first thread, refraining from recording the second event to the log.

14. The non-transitory computer readable medium of claim 13, further comprising instructions for:
determining that the file opened in the virtual machine is harmful based on an analysis of the generated log.

15. The non-transitory computer readable medium of claim 13, wherein the instructions for identifying the transfer of control to the least one altered guest physical memory page further comprises instructions for:
detecting that a second thread is executing code from a virtual address that is contained on the altered guest physical memory page, wherein the second thread was launched from the same process as a thread which altered the memory page.

16. The non-transitory computer readable medium of claim 13, wherein instructions for identifying the transfer of control to the least one altered guest physical memory page further comprises instructions for:
detecting that a second thread is executing code from the altered guest physical memory page, wherein the second thread was launched from a process different from the process that altered the memory page.

17. The non-transitory computer readable medium of claim 13, wherein instructions for identifying, during execution of the first thread, the first event that involves alteration of the at least one guest physical memory page comprises instructions for:
detecting a system call by the first thread of an application programming interface (API) function.

18. The non-transitory computer readable medium of claim 13, wherein instructions for determining the at least one altered guest physical memory page based on analysis of the log further comprises instructions for:
determining identifiers of the altered guest physical memory pages.

* * * * *